2,723,243

Patented Nov. 8, 1955

2,723,243

MANUFACTURE OF SILICA-METAL OXIDE SPHEROIDS

Donald L. Holden, Riverside, Ill., assignor to Universal Oil Products Company, Chicago, Ill., a corporation of Delaware No Drawing. Application July 30, 1952,
Serial No. 301,783

11 Claims. (Cl. 252—448)

This invention relates to the manufacture of silica-metal oxide spheroids and in one embodiment relates to the preparation of these spheroids for use as a catalyst for the conversion of hydrocarbons.

Silica, silica-alumina, and silica base catalysts containing other metal oxides have long been used as hydrocarbon conversion catalysts. In one method these are prepared by separately precipitating or coprecipitating the various components which are subsequently ground to the desired size. In another method catalysts are prepared in the form of spheres which are superior to the ground catalyst in that each individual sphere has inherent resistance to attrition, thereby reducing catalyst losses due to the formation of fines. Furthermore, the substantially spherical shape of the catalyst particles imparts to them the characteristic of flowing freely when used in moving bed or fluidized operations.

At present, silica-metal oxide catalysts are prepared by two general methods. The first, hereinafter called the impregnation method, comprises preparing a silica sol and subsequently dispersing the sol in the form of finely divided particles in a suitable medium wherein the sol sets into a gel when spheres are desired, or gelling the sol in another convenient form if ground catalyst is desired. For the purpose of this discussion only spherical catalysts will be considered, although it is understood that the present invention will apply to other forms of catalysts. The spheroids or substantially spherical particles are subsequently impregnated with a solution of metal salt which is precipitated in and on the spheroids with a basic solution. The impregnated gel spheroids are then washed, dried and calcined.

The second method of preparing spheroidal catalysts, hereinafter called the cogellation method, comprises mixing a solution of a metal salt with a silica sol and dispersing this mixture in the manner described above so as to cause the mixture to gel into hydrogel spheroids with the metal salt contained homogeneously therein.

A great deal of difficulty has been experienced in forming a catalyst having the proper physical and chemical characteristics by the two methods herein described. Spheres prepared by dropping a sol into a hot gelling medium and subsequently impregnating the gel have relatively large pores, relatively small surface area, low initial activity and a low average bulk density. The average bulk density is defined as the weight per unit volume of the catalyst in its final form. The low average bulk density of this catalyst and low volume per cent activity require that equipment constructed for the use of this catalyst must have the additional capacity required to contain the proper weight of material required to catalyze the desired conversion. The overly large pores, that is, pores whose diameter is in excess of that required for easy entrance and exit of hydrocarbon molecules and regenerating gas molecules, causes a reduction in the active surface area of the catalyst per unit of catalyst volume. A further limitation to the impregnated spheres is that the amount of alumina that can be successfully impregnated on a catalyst is limited. Furthermore, it is difficult to control the exact amount of alumina that will be impregnated into a catalyst composite in that it is difficult to predict how much of the impregnating solution will be retained in the catalyst during the soaking period and it is also difficult to predict what per cent of that which is retained will be precipitated firmly on the surface of the catalyst. Impregnation methods are also characterized by formations of metal oxide slimes which are precipitated metal salts that are not firmly bound to the spheroids. Slimes cause difficulty in washing and filtering the spheroids and further represent losses of material.

Catalyst spheroids prepared by the cogellation method also possess undesirable characteristics. The metal oxide content of cogelled spheres is limited because the addition of too much metal salt to the sol causes the spheroids to have these poor physical characteristics. The spheroids prepared by cogellation have relatively small pores, low thermal stability and they possess zeolitically held sodium which is difficult and costly to remove. Although the small pores and consequently large surface area of these spheres cause them to have a high initial activity, this activity is soon lost because the deposition of carbonaceous material on the catalyst, which is characteristic of cracking reactions, clogs the small pores and reduces the surface area drastically after a relatively short exposure to the hydrocarbon which is being converted. When clogged, the pores of cogelled catalysts are not easily regenerated in that they offer high resistance to the entry of regeneration gases into the internal surfaces of the spheroids. Cogelled catalyst spheroids are extremely dense so as to cause structural difficulties in designing commercial equipment in which the spheroids are to be used. This denseness is also wasteful since the additional material in a dense catalyst does not cause additional activity proportional to the increase in weight, that is, a dense catalyst has a low weight per cent activity relative to its volume per cent activity. When dropped and subsequently dried these spheroids tend to agglomerate or coalesce into masses and they have no spherical form when broken apart.

In spite of the disadvantages of cogelled catalysts the method is used extensively because of the advantages. The cogelled catalyst can be made with a minimum of operation stages thereby eliminating long soaking periods. Furthermore, the composition can be exactly controlled and the ultimate product is homogeneous.

I have found a method of preparing silica-metal oxide catalyst spheroids by a cogellation technique that eliminates the difficulties associated with cogelled catalysts.

The novel process of this invention comprises preparing a hydrosol which consists of silica sol, a gellable hydrous metal oxide sol, and a metal salt. The sol as prepared above is formed into gel spheroids which are subsequently dried and calcined forming hard catalytic particles. The chemical properties of a catalytic composite are largely dependent on its composition, that is, the activity of a catalyst depends largely upon its metal oxide content. The novel feature of this invention is to add the desired metal oxide content in two ways, by metal salt and by metal oxide sol. By varying the proportions of metal salt and metal oxide sol for any given metal oxide content, I have found that the physical properties of the final dried composite can be controlled. Suitable metal oxides for compositing with silica in this manner are those of aluminum, magnesium, zirconium, beryllium, vanadium, thorium and tantalum.

It is, therefore, an embodiment of this invention to regulate the physical characteristics of a catalyst by varying the proportion of metal salt solution to metal sol when making a composite with a given metal oxide content by the method of preparation as hereinbefore set forth.

It is a further embodiment of this invention to design a catalyst with the proper chemical characteristics by adding the amount of metal oxide required in addition to that from the metal salt as a gellable sol.

It is another embodiment of this invention to prepare spheroidal catalyst particles by dispersing the mixture described above in a medium of hot basic gas in such a manner as to cause the particles to gel into a semi-solid material while in transit through the basic medium and to be collected beneath the basic medium in a dry receiver or in one containing hot aqueous liquid, withdrawing the gelled particles from the receiver and subsequently drying and calcining to form hard spherical catalysts. The spheres formed by this method can range in size from what is commonly called microspheres to those having a diameter of ⅛″ or greater, the size of the spheres depending upon the method used to disperse the sol in the basic medium.

It is another embodiment of this invention to prepare the spheroidal catalyst described above by dispersing the sol in a hot liquid which is substantially immiscible with the sol which may or may not contain a basic substance, in a manner which causes the sol particles to assume a spheroidal shape and to gel into firm hydrogel spheroids while in transit through the hot liquid, collecting and removing the spheroids from the gelling apparatus in a circulating stream of water maintained beneath the column of hot liquid.

Although the catalyst of this invention is primarily useful in promoting cracking reactions, this catalyst composition may be employed for effecting other conversion reactions including (1) treatment of gasoline to improve its antiknock characteristics, in processes commonly known as reforming, isoforming, retreating, etc. (2) alkyl transfer reactions as, for example, the reaction of xylene with benzene to produce toluene, etc. (3) refining of hydrocarbons, particularly gasoline treating to remove undesirable impurities, such as sulfur, etc. (4) alkylation of aromatics or isoparaffinic hydrocarbons with olefinic hydrocarbons, alcohols, esters, etc. (5) polymerization of unsaturated hydrocarbons to form higher boiling products, etc. In addition this catalyst may find particular utility in the treatment of other organic materials as, for example, the dehydration of alcohols to form hydrocarbons, etc. The temperature and pressure to be employed in each process will depend upon the particular reaction to be effected.

When used as a cracking catalyst, the catalyst of this invention is contacted with the hydrocarbon to be cracked at a temperature of from about 700° F. to about 1200° F. and a pressure of from atmospheric to 1000 p. s. i. or more.

Following are several examples which illustrate more clearly the advantages of the catalyst of this invention over those prepared by previous methods. Example I illustrates catalysts manufactured by the impregnation method, Example II illustrates catalysts manufactured by the cogellation method, Example III and IV illustrate catalysts manufactured by the method of this invention. A general example of preparing the catalysts in the method of this invention is as follows: Water glass is added to a mixture of acid, such as sulfuric acid, hydrochloric acid, nitric acid, acetic acid, etc. and a solution of metal nitrate such as aluminum sulfate, aluminum nitrate, aluminum acetate, etc., and to the resultant mixture is added a gellable hydrous metal oxide sol, such as alumina sol. The resultant mixture preferably has a solids content within the range of from about 4 to about 10% by weight, calculated as silica in the final dried composite, a metal salt content of from about 0.5 to about 15 weight per cent calculated as alumina in the dried composite, and an alumina sol content of from about 5 to about 60 weight per cent calculated as alumina, in the dried composite. The quantity of acid preferably is sufficient to impart to the sol a pH of from about 2 to about 5. In a preferred embodiment the sol prepared as herein described is dispersed as droplets in an atmosphere of basic gas, such as ammonia, methyl amine, ethyl amine, etc., and falls through the basic gas forming firm gel spheroids while in transit. The resultant spheroids preferably are collected in a receiver containing a hot aqueous liquid, the temperature of this liquid being from about 85° F. to about 220° F., being controlled to maintain an equilibrium with the basic gas wherein the aqueous liquid will have a pH of from about 7 to about 10. The spheroids thus formed are separated from the aqueous liquid and preferably are washed, dried at a temperature of from about 100° F. to about 600° F., and calcined at a temperature of from about 800° F. to about 1400° F.

The specific method of preparation of each of the catalysts subsequently described is set forth in each example.

EXAMPLE I

Example I illustrates spherical silica-alumina catalysts prepared by the impregnation method. The silica sol used in the manufacture of this catalyst was prepared by adding 2750 ml. of filtered water glass, "N" Brand, diluted to a specific gravity of 1.200, to a mixture of 2000 ml. of water and 1200 ml. of 20% sulfuric acid. The mixture prepared in this manner produced a silica hydrosol having a pH of 3.1, and the hydrosol was formed into hydrogel spheroids by passing droplets thereof through an atmosphere of ammonia gas which was at a temperature of about 160° F. The spheroids were collected in an aqueous layer maintained at a temperature of 200° F. The resultant hydrogel spheroids were immersed in a 0.5 molar solution of aluminum sulfate for 30 minutes, after which excess aluminum sulfate was drained off to the spheres, and while contained in the same vessel, the hydrogel spheroids were immersed in 3% ammonium hydroxide solution for 30 minutes to precipitate aluminum hydroxide. Excess solution was then drained off and the spheroids were washed with water containing 0.1 weight per cent of ammonium sulfate, the ammonium sulfate being used to base exchange ammonium ions for sodium ions. The spheroids were then dried at 300° F. for 6 hours, after which the temperature was slowly raised to 1200° F. where it was maintained for 12 hours. The properties of the spheres prepared in the foregoing method are set forth in Table I below:

*Table I*

| | |
|---|---|
| Per cent $Al_2O_3$ as sol | 0 |
| Per cent $Al_2O_3$ as soluble aluminum | 0 |
| Per cent $Al_2O_3$ from impregnation | 10.2 |
| Per cent $Na_2O$ | 0.011 |
| Per cent solids | 11.3 |
| Surface area (m.$^2$/g.) | 410 |
| Pore diameter Å | 118 |
| Initial activity: | |
|    ABD | 0.25 |
|    Volume per cent | 36 |
|    Weight per cent | 72 |
| Thermal activity: | |
|    ABD | 0.33 |
|    Volume per cent | 36 |
|    Weight per cent | 55 |

The volume per cent activity represented in Table I is obtained by comparing the conversion of the catalyst being tested to that of a standard catalyst in which both catalysts are subjected to a standard test which comprises passing a 31° API Mid-Continent gas oil through a catalyst sample at 932° F. and a four liquid hourly space velocity, the liquid hourly space velocity being defined as the volume of oil passing through the catalyst per hour, divided by the volume of catalyst. The weight per cent activity is obtained in the same manner as described above wherein the data obtained from the volume activity test is calculated on a weight basis. Thermal activity of a catalyst is determined by a standard test which comprises subjecting a sample of the catalyst to a temperature of 1650° F. for 6 hours and subsequently running a standard activity test as described above. The object of this test is to ascertain the ability of the catalyst to withstand high temperatures, such as those experienced in the normal operation of a plant, without losing activity. Pore diameter is simply a measurement of the average diameter of the catalyst pores in Angstrom units. Pore diameters between 40 Å. and 90 Å. are in the operable range, that is, large enough to permit entry of hydrocarbon and regenerating gas molecules, but not so large as to reduce the surface area. The surface area is the area of the surface, both internal and external, of 1 gram of catalyst as measured by adsorption techniques. With all other things equal, the catalyst activity is roughly proportional to the surface area. The average bulk density of catalyst particles is defined as the density in grams per milliliters of the catalyst as it exists collectively, that is, the weight of the catalytic material, the pore volumes, and the air spaces between particles per unit of volume occupied by the catalyst. It is generally known in the art that average bulk densities between 0.4 and 0.8 are optimum. Spheres made by this method have excellent form.

EXAMPLE II

Example II illustrates spheres prepared by the cogellation method. The hydrosol in this example was prepared by adding a mixture of 2000 ml. of water and 2400 ml. of filtered water glass, Brand "N," diluted to a specific gravity of 1.200 to a mixture of 600 ml. of 20% sulfuric acid and 800 ml. of 15 weight per cent aluminum sulfate solution to give a resultant hydrosol having a pH of 3.5 and an aluminum content of 14.4 weight per cent alumina on a dry basis. Hydrogel spheroids were formed from this sol in the same manner as those formed in Example I. Table II below contains the analytical data determined on the spheres of this example.

*Table III*

| | |
|---|---|
| Percent $Al_2O_3$ as sol | 0 |
| Percent $Al_2O_3$ as soluble aluminum | 14.4 |
| Percent $Al_2O_3$ from impregnation | 0 |
| Percent $Na_2O$ | 0.12 |
| Percent solids | 7.9 |
| Surface area (m.²/g.) | 367 |
| Pore diameter Å | 29 |
| Initial activity: | |
| ABD | 0.73 |
| Volume percent | 120 |
| Weight percent | 82 |
| Thermal activity: | |
| ABD | 0.90 |
| Volume percent | 41 |
| Weight percent | 23 |

The spheres of Example II experienced substantial agglomeration upon drying causing a large percentage of the catalyst, in spherical form, to be lost. The large chunks of catalyst tended to attrite in use causing substantial catalyst losses due to the formation of fines. The tendency to agglomerate is less noticeable in catalysts containing smaller amounts of alumina. Therefore, it can be seen that the amount of soluble alumina that can be incorporated into cogelled spheres is limited by the ultimate properties of the spheres thus formed. A further limitation on the amount of alumina that can be incorporated into a sol as soluble salt is that the aluminum salt precipitates out of solution as a gelatinous mass if too great a concentration is added. The gelatinous mass must be filtered from the sol before the sol can be dropped, which causes an additional processing step and a loss of material.

EXAMPLE III

Example III illustrates spheres prepared by the method of this invention. The hydrosol was prepared by adding a mixture of 1690 ml. of water and 2250 ml. of water glass, "N" Brand, diluted to a specific gravity of 1.200, to a mixture of 220 ml. of 15% aluminum sulfate solution and 880 ml. of 20% sulfuric acid. To this mixture was added 92 ml. of alumina sol diluted with 220 ml. of water. The resultant sol was dispersed in ammonia in the same manner as described in Example I. The hydrogel spheroids were collected in a hot aqueous receiver which was at a temperature of 176° F. The spheroids thus formed were washed with 0.1 weight per cent ammonium sulfate solution and then dried at 200° F. for 6 hours, after which the temperature was slowly raised to 1200° F. where it was maintained for 12 hours. The properties of the spheres prepared by the foregoing method are set forth in Table III.

*Table III*

| | |
|---|---|
| Percent $Al_2O_3$ as sol | 7.5 |
| Percent $Al_2O_3$ as soluble aluminum | 2.5 |
| Percent $Al_2O_3$ from impregnation | 0 |
| Percent $Na_2O$ | .051 |
| Percent solids | 7.6 |
| Surface area (m.²/g.) | 462 |
| Pore diameter Å | 47 |
| Initial activity: | |
| ABD | 0.63 |
| Volume percent | 93 |
| Weight percent | 74 |
| Thermal activity: | |
| ABD | 0.68 |
| Volume percent | 64 |
| Weight percent | 47 |

The physical form of the spheres as prepared by this method was excellent.

EXAMPLE IV

The catalyst of Example IV is another catalyst prepared by the method of this invention. This catalyst was prepared by the same procedure as that of the catalyst in Example III, however, a greater proportion of the alumina in this example was added as a soluble salt of aluminum. The properties of the catalyst in Example IV are set forth in Table IV below:

*Table IV*

| | |
|---|---|
| Percent $Al_2O_3$ as sol | 5 |
| Percent $Al_2O_3$ as soluble aluminum | 7 |
| Percent $Al_2O_3$ from impregnation | 0 |
| Percent $Na_2O$ | 0.014 |
| Percent solids | 7.0 |
| Surface area (m.²/g.) | 446 |
| Pore diameter Å | 52 |
| Initial activity: | |
| ABD | 0.5 |
| Volume percent | 80 |
| Weight percent | 80 |
| Thermal activity: | |
| ABD | 0.73 |
| Volume percent | 79 |
| Weight percent | 54 |

The spheres as prepared in Example IV are excellent in form and physical properties. As can be seen from the the examples nothing is sacrificed to obtain the superior spheres of this method. The physical properties of these spheres are all in what is known to be the optimum range and the chemical properties are superior to the spheres of the other methods as evidenced by the high activity and, more important, good thermal stability. It can further be seen from the examples that the spheres of this invention can be prepared in a one-step operation. All of the final components are incorporated in the sol in exactly the right proportions and the sol when dropped and gelled requires no further modification by impregnation or aging. This method of manufacture is particularly well adapted for a commercial, continuous type of operation which makes volume production practical.

I claim as my invention:

1. A method for the manufacture of a composite of silica and an oxide of a metal which comprises commingling a silica sol, a gellable hydrous oxide sol of said metal and an acidic solution of a salt of said metal, contacting the resultant mixture with a basic medium and thereby forming a firm gel, and calcining said gel.

2. The method of claim 1 further characterized in that said metal is aluminum.

3. The method of claim 1 further characterized in that said metal is selected from the group consisting of aluminum, magnesium, zirconium, beryllium, vanadium, thorium, tantalum.

4. The method of claim 1 further characterized in that said metal salt solution is an aluminum sulfate solution.

5. The method of claim 1 further characterized in that said basic medium is ammonia gas.

6. The method of claim 1 further characterized in that said mixture is dispersed as droplets in an atmosphere of ammonia gas, said droplets forming firm gel spheroids while falling through said ammonia gas atmosphere, said gel spheroids collecting in a receiver disposed beneath said ammonia gas atmosphere, removing said gel spheroids from said receiver, drying and calcining said gel spheroids thereby forming spheroids of silica-metal oxide composite.

7. A method of manufacture of silica-alumina spheroidal catalytic composites which comprises adding dilute water glass to a solution of sulfuric acid and aluminum sulfate, adding an alumina sol to the resultant mixture to produce a silica-alumina sol having a solids content of from about 4 to about 10 weight per cent of silica, an aluminum sulfate content of from about 0.5 to about 15 weight per cent calculated as alumina, an alumina sol content of from about 2 to about 60 weight per cent calculated as alumina, and a pH of from about 2 to about 5, dispersing said silica-alumina sol as droplets in an atmosphere of hot ammonia gas, said droplets forming firm gel spheroids while falling through said ammonia gas atmosphere, collecting said spheroids in a receiver containing hot aqueous liquid maintained at a temperature of from about 85° F. to about 220° F., the temperature being selected to maintain said aqueous liquid in equilibrium with said ammonia gas at a pH of from about 7 to about 10, separating said gel spheroids from said aqueous liquid, washing, drying at a temperature of from about 100° F. to about 600° F. and calcining at a temperature of from about 800° F. to about 1400° F.

8. The method of preparing a hydrosol suitable for preparing a dried composite having an average bulk density in the range of from about 0.4 gram per ml. to about 0.8 gram per ml. and a given alumina content of from about 0.5 to about 60 weight per cent which comprises commingling a silica sol with an acidic aluminum salt solution and an alumina sol in proportions to form a composite having said given alumina content, and regulating the average bulk density of the final composite by varying the proportion of aluminum salt to alumina sol used while maintaining said given alumina content.

9. The method of preparing a hydrosol suitable for preparing a dried composite having an average pore diameter in the range of from about 40 Å. to about 90 Å. and a given alumina content of from about 0.5 to about 60 weight per cent which comprises commingling a silica sol with an acidic aluminum salt solution and an alumina sol in proportions to form a composite having said given alumina content, and regulating the average pore diameter of the final composite by varying the portion of aluminum salt to alumina sol while maintaining said given alumina content.

10. A composition suitable for the preparation of a dried silica-alumina composite comprising a silica sol, an alumina sol and an acidic aluminum salt solution in proportions to form a mixture having a silica content of from about 4 to about 10 weight percent, an alumina sol content of from about 5 to about 60 weight percent calculated as alumina, an aluminum salt content of from about 0.5 to about 15 weight percent calculated as alumina, and a pH of from about 2 to about 5.

11. As a composition of matter, a gelled and calcined mixture of a silica sol, an alumina sol and an acidic aluminum salt solution, said mixture of sols and salt solution having a silica content of from about 4 to about 10 weight percent, an alumina sol content of from about 5 to about 60 weight percent calculated as alumina, an aluminum salt content of from about 0.5 to about 15 weight percent calculated as alumina, and a pH of from about 2 to about 5.

References Cited in the file of this patent

UNITED STATES PATENTS

| | | |
|---|---|---|
| 2,356,576 | Free et al. | Aug. 22, 1944 |
| 2,384,946 | Marisic I | Sept. 18, 1945 |
| 2,386,810 | Marisic II | Oct. 16, 1945 |
| 2,548,860 | Bond | Apr. 17, 1951 |
| 2,588,402 | Milliken | Mar. 11, 1952 |
| 2,645,619 | Hoekstra | July 14, 1953 |
| 2,647,875 | Marisic | Aug. 4, 1953 |
| 2,657,183 | Bechtold | Oct. 27, 1953 |